May 5, 1970
G. FREJAVILLE ET AL
3,510,519
PREPARATION OF DEUTERIZED COMPOUNDS
Filed Dec. 1, 1965
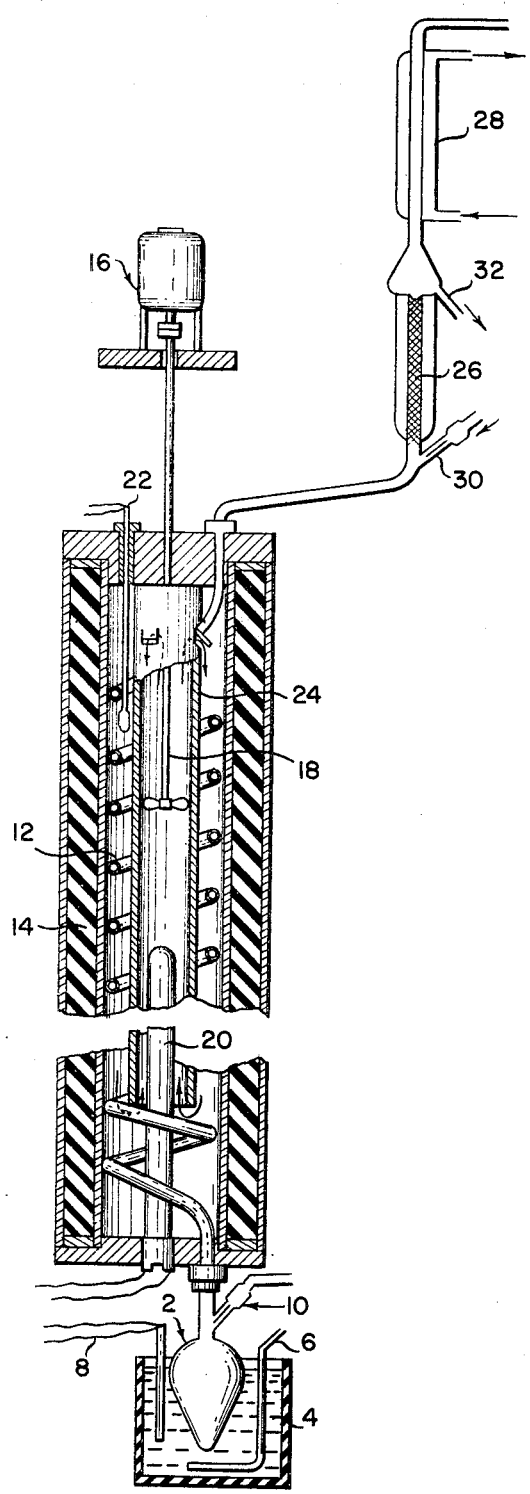
INVENTORS
Gérard Frejaville
Jean Jullien
BY *Littlepage & Quaintance*
ATTORNEYS United States Patent Office 3,510,519
Patented May 5, 1970

3,510,519
PREPARATION OF DEUTERIZED COMPOUNDS
Gerard Frejaville and Jean Jullien, Orsay, Essone, France, assignors to Etablissement Public: Centre National de la Recherche Scientifique, Paris, France, a corporation of France
Filed Dec. 1, 1965, Ser. No. 510,846
Claims priority, application France, Dec. 1, 1964, 996,978
Int. Cl. C07c 83/00
U.S. Cl. 260—583
9 Claims

ABSTRACT OF THE DISCLOSURE

A method of producing deuterized compounds in higher yields comprising contacting and reacting under continuous non-turbulent countercurrent flow conditions (1) a compound having at least one protonizable hydrogen atom and (2) a compound having a reactive deuterium atom, one of said compounds being in liquid form and the other being in gaseous form; said reaction taking place in a reaction zone having a small transverse dimension.

---

The present invention relates to a method for preparing deuterized compounds; i.e. hydrogen containing compounds in which one or more hydrogen atoms are substituted by one or a plurality of deuterium atoms, these compounds being frequently prepared by exchange reaction with heavy water. The substitution of deuterium atoms for hydrogen atoms in the starting hydrogenated compound may be achieved by contacting heavy water with the compound to be deuterized and intimately mixing them, so that deuterium atoms assume the place of the protonizable hydrogen atoms in said starting compound. Such a method, however, does not allow the use of all the deuterium available in the heavy water employed and the deuterium contents of the final, deuterized compound is very much lower than that of said heavy water. In order to obtain a product with a sufficient deuterium content, it is necessary to resort to a series of successive operations during which heavy water having a higher deuterium content is re-introduced at each operation.

Another method consists in causing heavy water to hydrolize compounds such as metal alcoholates or similar metal compounds, such as, for instance alkaline amides; this method involves however a series of additional chemical handling operations which correspondingly increase the cost of the deuterized compounds obtained.

In order to obviate the various disadvantages presented by the former art methods, it is an object of the invention to provide an improved method for preparing deuterized compounds, whereby the cost of such products is very substantially decreased, by reducing the number of the required operations.

To this end, the method according to the invention consists in contacting in continuous countercurrent circulation, a compound containing at least one protonizable hydrogen atom, capable of being substituted by a deuterium atom, with a deuterizing compound capable of exchanging its deuterium atoms with said hydrogen atoms, one of said compounds being in the liquid state and the other in the gaseous state, the circulation being effected with substantially parallel streams and through a reaction zone having a small transverse dimension with respect to the length thereof.

The circulation is operated at a temperature between that of the boiling point of the deuterizing compound and that of the compound to be deuterized.

The ratio of the length of the reaction zone in which the reactants are circulated to the transverse dimension thereof is at least equal to 1000 to 1.

The respective amounts of the compound which gives up its deuterium and of the compound to be deuterized are selected in such a manner that the operations take place under substantially stoichiometric conditions.

When operating according to the invention it is possible to obtain in a single exchange operation a deuterized compound the deuterium content of which is close to that of the deuterizing compound; accordingly, the invention enables the more rapid production of a deuterized compound with a maximum deuterium content, while a better use is made of the available amount of deuterium. The cost of the deuterized products prepared is thus substantially lower than that resulting from conventional methods.

The invention will be best understood from the following description and appended drawing the single figure of which is a cross-sectional view of an apparatus for carrying out the method of the invention.

The product to be deuterized should contain a protonizable hydrogen, for instance a hydrogen atom in α-position of a C=O bond, or linked to an oxygen, sulfur, nitrogen or like atom, said hydrogen atom being replaceable by a deuterium atom.

The circulation of the reagents must be carried out substantially in parallel streams, so as to avoid turbulence during the exchange and to cause the gaseous and the liquid reagents to be circulated in countercurrent, in a continuous process. The operation takes place under substantially stoichiometric conditions, preferably at a slightly higher ratio than this, if it is desired to achieve a greater speed of preparation.

The feeding speed of each reagent is determined for each individual reagent, to obtain a uniform flow and in order that the requested hydrogen-deuterium exchange may occur during the period of time corresponding to the distance covered in the reaction zone. The temperature at which the operation takes place is selected so that, during the exchange, one of the products is in the gaseous state and the other in the liquid state, and, also, that there is a convenient concentration of the gaseous reagent in the liquid phase. The operation is effected substantially at a temperature between the boiling points of the two products being reacted.

This method may be applied to the deuterizing of a multiplicity of chemical compounds having protonizable hydrogen atoms. The only condition to satisfy in this respect is that the compounds to be deuterized and the deuterizing compound have sufficiently different boiling points for the exchange to take place between the liquid phase and the vapour phase; it is thus possible to utilize heavy-water as deuterizing compound for deuterizing products such as acetone, methanol or glycol. On the other hand, for deuterizing substances such as ethylene diamine, it is preferable to use a deuterizing compound, deuterized methanol $CH_3OD$. It is sometimes desirable to resort to a catalyst; for instance, for preparing hexadeuterized acetone $CD_3COCD_3$ through exchange of acetone $CH_3COCH_3$ with heavy water $D_2O$, a catyst (for example $SO_4D_2$ or NaOD) may be added to the heavy water.

The above described method may be carried out in an apparatus such as illustrated in the appended drawing. Said apparatus comprises a boiler 2 adapted to be maintained at a constant temperature by means of an oil bath 4 heated through a resistanec 6, the temperature of said bath being adjusted by means of a contact thermometer 8; this conventional control equipment might be replaced by any similar system adapted to accurately adjust the temperature. Boiler 2 is used here as evaporator, but any other type of evaporator may be resorted to.

Said boiler 2 is equipped with an adjustable-flow feeding system 10 through which either the compound to be deuterized or the deuterizing compound is fed to said boiler. Said feeding system consists of conventional injectors adapted to accurately adjust the feed. If it is desired to obtain a continuous discharge of the liquid products, it is merely necessary to fit the lower part of boiler 2 with an outlet pipe provided with a siphon.

Boiler 2 is connected to a column 12 which is of a small cross-section relative to its length. Said column should be sufficiently long to permit an exchange to be effected with a good efficiency between the reagents during the time said reagents flow therethrough. By way of example, a column 20 meters long and having a diameter of 5 mm. (the ratio length/diameter being thus equal to 4000) enables efficiencies of about 95% to be reached. It is however to be understood that said dimensions are not limitative, and a longer column would enable to still improve the exchange efficiency.

In the drawing, the column is shown helically wound inside a constant temperature enclosure 14; the helical arrangement of the column has been selected in order to reduce the overall dimensions of the apparatus but a straight column could be as well be used. Enclosure 14, is filled with an oil bath circulated by means of a motor 16 driving a stirrer 18. The oil is heated by means of a heating rod 20, the temperature control being achieved by menas of a contact therometer 22.

The oil stirred by agitator 18 flows within enclosure 14 through openings provided at the upper end of a tube 24 arranged coaxially with rod 20 and enclosure 14, said tube being secured at the upper end of said enclosure 14. Outside of enclosure 14, the upper end of column 12 is connected to a conventional distillation system including a distillation column 26 topped by a refrigerating assembly 28. The lower end portion of said distillation column is equipped with an adjustable-output feeding system 30 which allows the introduction at predetermined rates of either the product to be deuterized or the deuterizing compound; said system consists of a conventional injector. The upper end portion of column 26 includes an outlet pipe 32 for recovering the products.

The operation of the apparatus may be readily understood from the above description and need not be described in more detail.

For a given system of a compound to be deuterized and a deuterizing compound, the temperature of the temperature-controlled bath of boiler 2 and of the temperature controlled bath surrounding column 12 are adjusted to the required value between the boiling points of both compounds. The feed of injectors 10 and 30 are adjusted and the injection of the deuterizing compound is started first; the injection of the compound to be deuterized is start only after said deuterizing compound has filled up the whole apparatus. In the event the boiling point of the deuterizing compound is higher than that of the compound to be deuterized, the latter is fed at the top of the apparatus through injector 30, whereas the product to be deuterized is fed into the boiler through injector 10; in the contrary case, the deuterizing compound is fed into the boiler through injector 10 and the other compound at the top through injector 30.

Once the whole system has been started and the feeds have been adjusted once for all, the apparatus requires but little further control for its operation.

The method of the invention enables substances to be prepared which are miscible or non-miscible with the deuterizing compound; in the latter case, it is merely necessary to add to the distillation column a conventional separator equipment.

By way of example, various compounds were deuterized according to the invention by means of different deuterizing compounds in the above described apparatus. The operating conditions and results obtained are listed in the table hereafter. In said table, compounds A are the compounds to be deuterized, and compounds B are the deuterizing compounds. The $D_2$ percentage is the percentage by weight of $D_2$ replacing $H_2$ in the deuterized compounds. In each case the respective flow rates of the reactants were such that the molar ratio of the deuterizing compound to the compound to be deuterized was between 5 and 10% higher than stoichiometry.

TABLE

| Ex. No. | Compound to be deuterized | Deuterizant compound | Temperature reactor enclosure, °C. | Temperature of boiler, °C. | Conversion rate | Percent $D_2$ in the product |
|---|---|---|---|---|---|---|
| 1 | Acetone | 99.7% $D_2O$ | 90 | 110 | 85 | 99.6 |
| 2 | Methanol | 99.7% $D_2O$ | 90 | 110 | 90 | 99.6 |
| 3 | Glycol | 99.7% $D_2O$ | 160 | 180 | 92 | 99.6 |
| 4 | T. Amyl alcohol | 99.7% $C_6H_5CH_2OD$ | 160 | 180 | 92 | 99.5 |
| 5 | Isopropylamine | 99.7% $D_2O$ | 60 | 90 | 90 | 99.6 |
| 6 | Ethylene diamine | 99.7% $CH_3OD$ | 90 | 110 | 90 | 99.6 |

We claim:
1. A method for preparing deuterized compounds comprising the steps of contacting in an elongated reaction zone having a length at least 1000 times greater than its transverse dimension, a flow of a first compound having at least one protonizable hydrogen atom capable of being substituted by a deuterium atom and a counter-current flow of a second deuterium containing compound selected from the group consisting of deuterium oxide and deuterized alcohols capable of exchanging deuterium with said at least one protonizable hydrogen atom, said compounds having different boiling points and maintaining the temperature of said reaction zone between the boiling points of said first and second compounds so that one of said first and second compounds is maintained in a liquid state and the other in a vapor state, each of said flows being formed of substantially parallel streams, whereby said protonizable hydrogen atoms of said first compound are substituted by said deuterium atoms of said second compound.

2. The method of claim 1, in which said second compound is $D_2O$.

3. The method of claim 1, in which said second compound is $CH_3OD$.

4. The method of claim 1, in which said first compound is acetone.

5. The method of claim 1, in which said first compound is methanol.

6. The method of claim 1, in which said first compound is glycol.

7. The method of claim 1, in which said first compound is t. amyl alcohol.

8. The method of claim 1, in which said first compound is isopropylamine.

9. The method of claim 1, in which said first compound is ethylene diamine.

References Cited

Schwarz et al.: Chemical Abstracts, vol. 28, p. 4306[6] (1934).

Hine et al.: Chemical Abstracts, vol. 48, p. 4943i (1954).

CHARLES B. PARKER, Primary Examiner

R. L. RAYMOND, Assistant Examiner

U.S. Cl. X.R.

260—593, 609, 632, 635